US008922626B2

(12) United States Patent
Aoki

(10) Patent No.: US 8,922,626 B2
(45) Date of Patent: Dec. 30, 2014

(54) STEREO CAMERA APPARATUS AND METHOD OF OBTAINING IMAGE

(75) Inventor: Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 355 days.

(21) Appl. No.: 13/412,690

(22) Filed: Mar. 6, 2012

(65) Prior Publication Data

US 2012/0236124 A1 Sep. 20, 2012

(30) Foreign Application Priority Data

Mar. 18, 2011 (JP) ................................. 2011-061724

(51) Int. Cl.
G01S 11/12 (2006.01)
G01C 3/08 (2006.01)
H04N 13/02 (2006.01)
H04N 5/341 (2011.01)
H04N 13/00 (2006.01)

(52) U.S. Cl.
CPC ................. G01S 11/12 (2013.01); G01C 3/085 (2013.01); H04N 13/0239 (2013.01); H04N 5/341 (2013.01); H04N 13/0296 (2013.01); H04N 2013/0081 (2013.01)
USPC .................... 348/47; 348/36; 348/42; 348/49

(58) Field of Classification Search
None
See application file for complete search history.

(56) References Cited

U.S. PATENT DOCUMENTS

| 4,601,053 | A |   | 7/1986  | Grumet |
|-----------|---|---|---------|----------------------|
| 5,860,912 | A | * | 1/1999  | Chiba ............................ 600/111 |
| 7,844,134 | B2 |  | 11/2010 | Sasaki et al. |
| 2005/0280702 | A1 | * | 12/2005 | Nakano et al. .................. 348/42 |
| 2008/0136612 | A1 |   | 6/2008  | Machii et al. |
| 2010/0283837 | A1 |   | 11/2010 | Oohchida et al. |
| 2011/0018972 | A1 | * | 1/2011  | Pan ................................ 348/47 |
| 2011/0122232 | A1 | * | 5/2011  | Hoshino ........................ 348/47 |
| 2011/0242356 | A1 | * | 10/2011 | Aleksic et al. ............. 348/222.1 |
| 2011/0304746 | A1 | * | 12/2011 | Iijima et al. ................ 348/229.1 |
| 2012/0063637 | A1 | * | 3/2012  | Tardif ........................... 382/103 |

FOREIGN PATENT DOCUMENTS

| JP | 11-325890   | 11/1999 |
|----|-------------|---------|
| JP | 2004-032244 | 1/2004  |
| JP | 2007-142929 | 6/2007  |

OTHER PUBLICATIONS

Extended European Search Report dated Sep. 4, 2012.
Japanese Office Action dated Oct. 21, 2014.

* cited by examiner

Primary Examiner — Gims Philippe
Assistant Examiner — Samuel D Fereja
(74) Attorney, Agent, or Firm — IPUSA, PLLC

(57) ABSTRACT

A stereo camera apparatus for obtaining distance information of an object includes a camera unit that includes a left image sensor and a right image sensor respectively obtaining a left-side image and a right-side image, each being composed of a frame including plural pixels of plural rows and plural columns, the left image sensor and the right image sensor sequentially exposing the pixels of the rows from upper to lower in the frames, respectively; a shift amount detection unit that detects a relative positional shift amount in the vertical direction between a left-side image and a right-side image; and a timing control unit that changes the starting time of exposing the frame by the left image sensor or by the right image sensor based on the positional shift amount in the vertical direction detected by the shift amount detection unit.

10 Claims, 15 Drawing Sheets

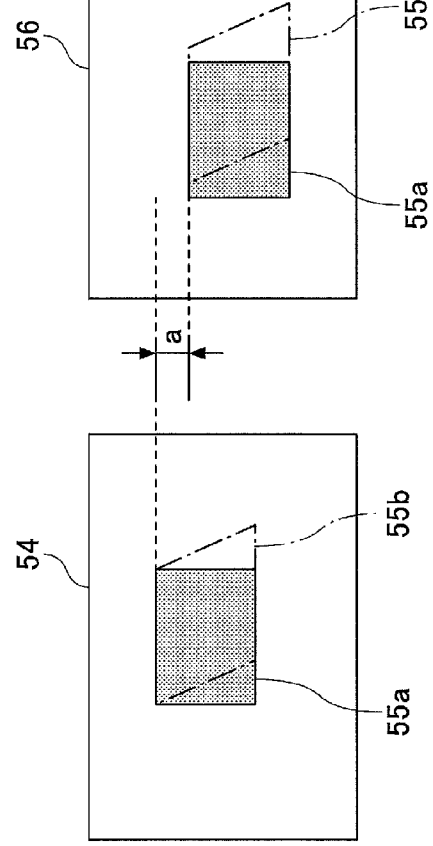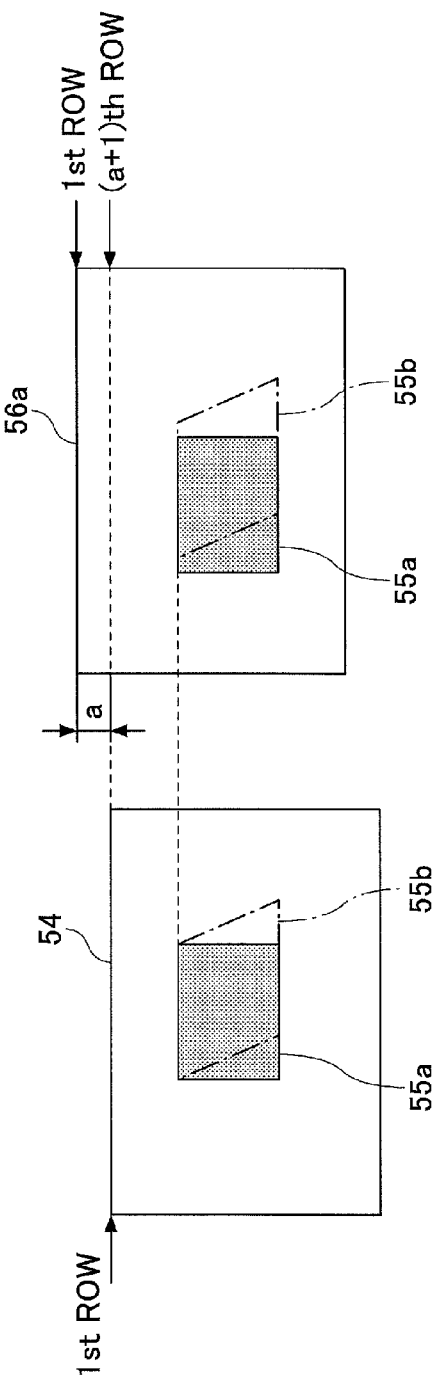
FIG.4A RELATED ART
FIG.4B RELATED ART

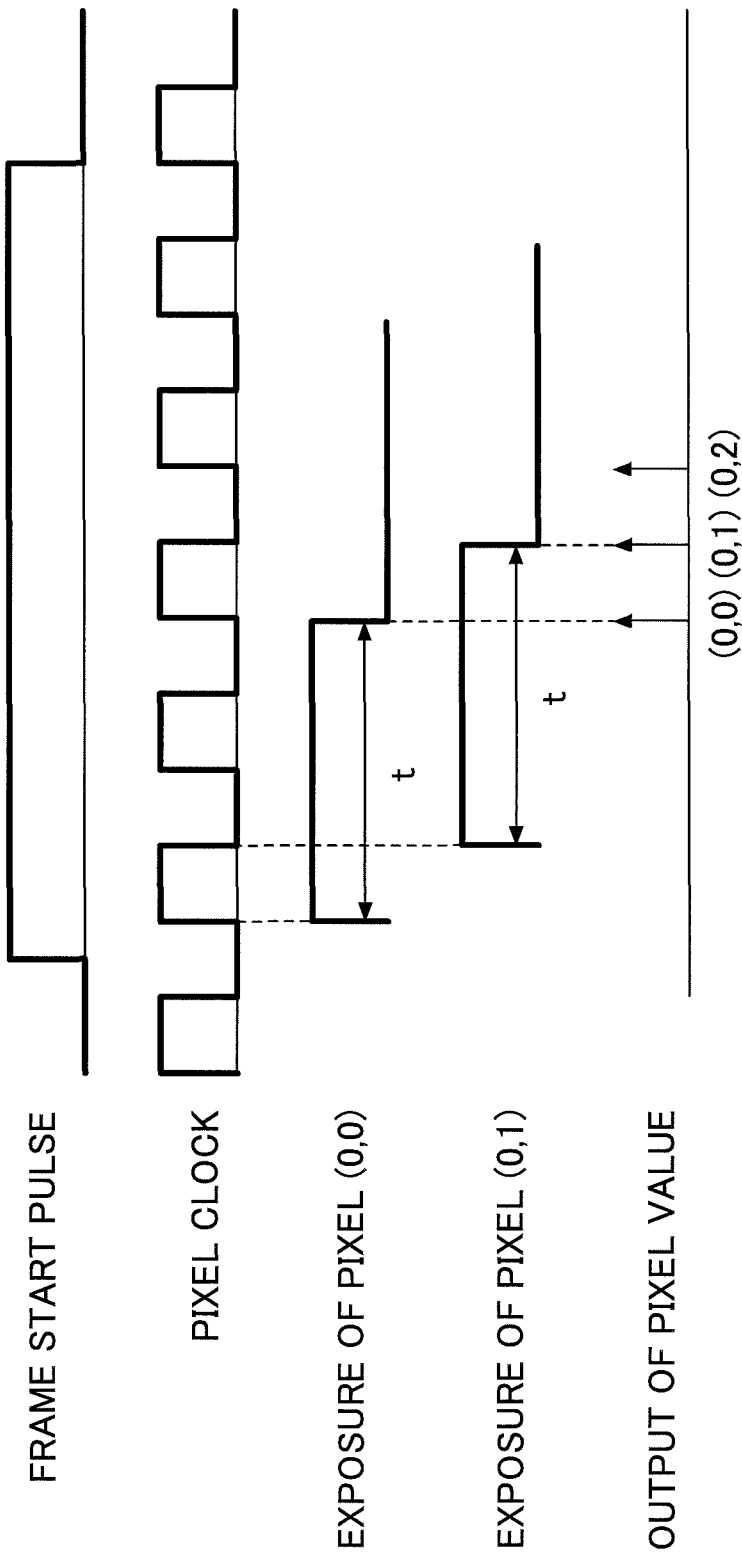

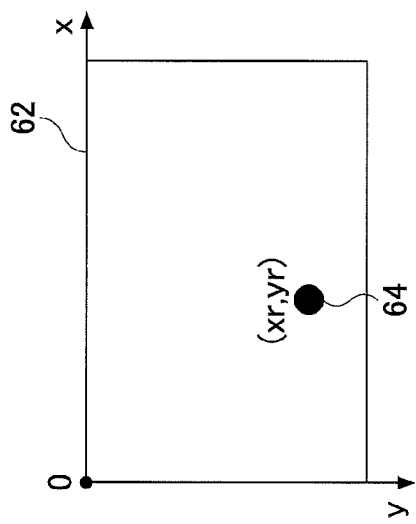
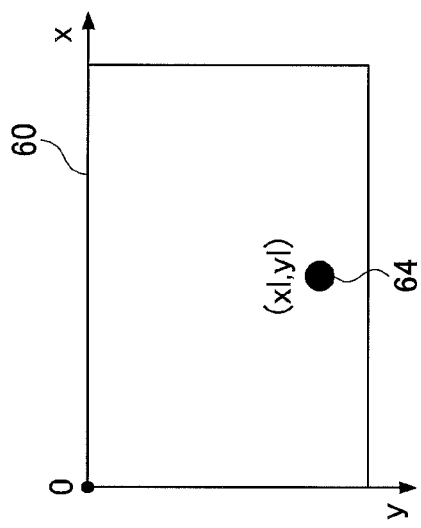
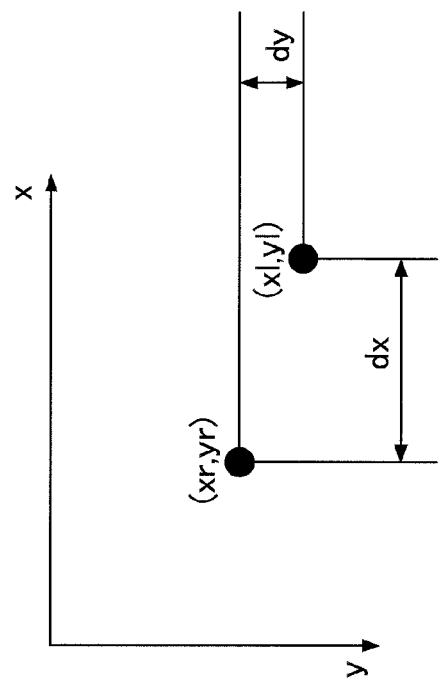
FIG.9A
FIG.9B

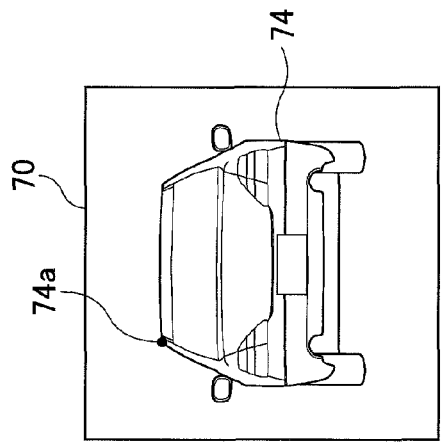
FIG.11C
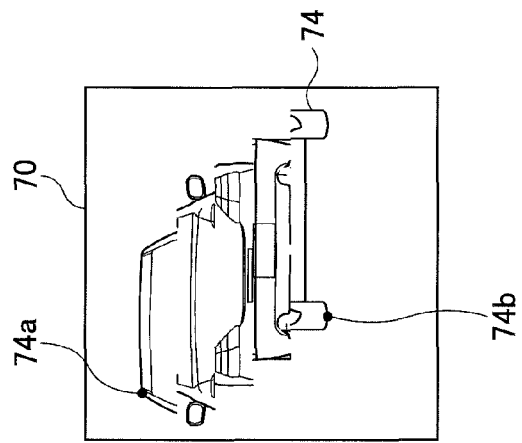
FIG.11D
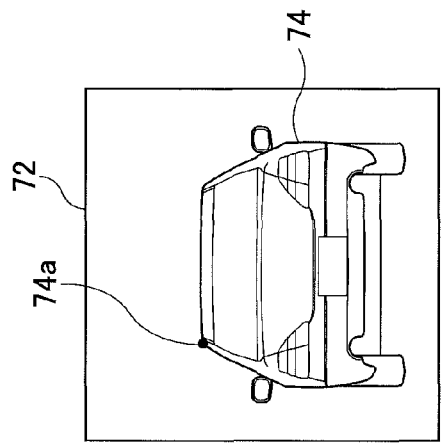
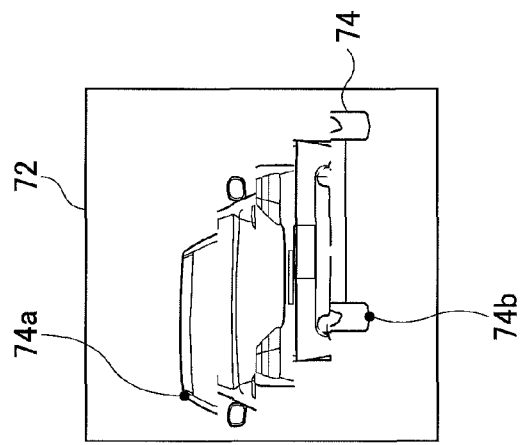

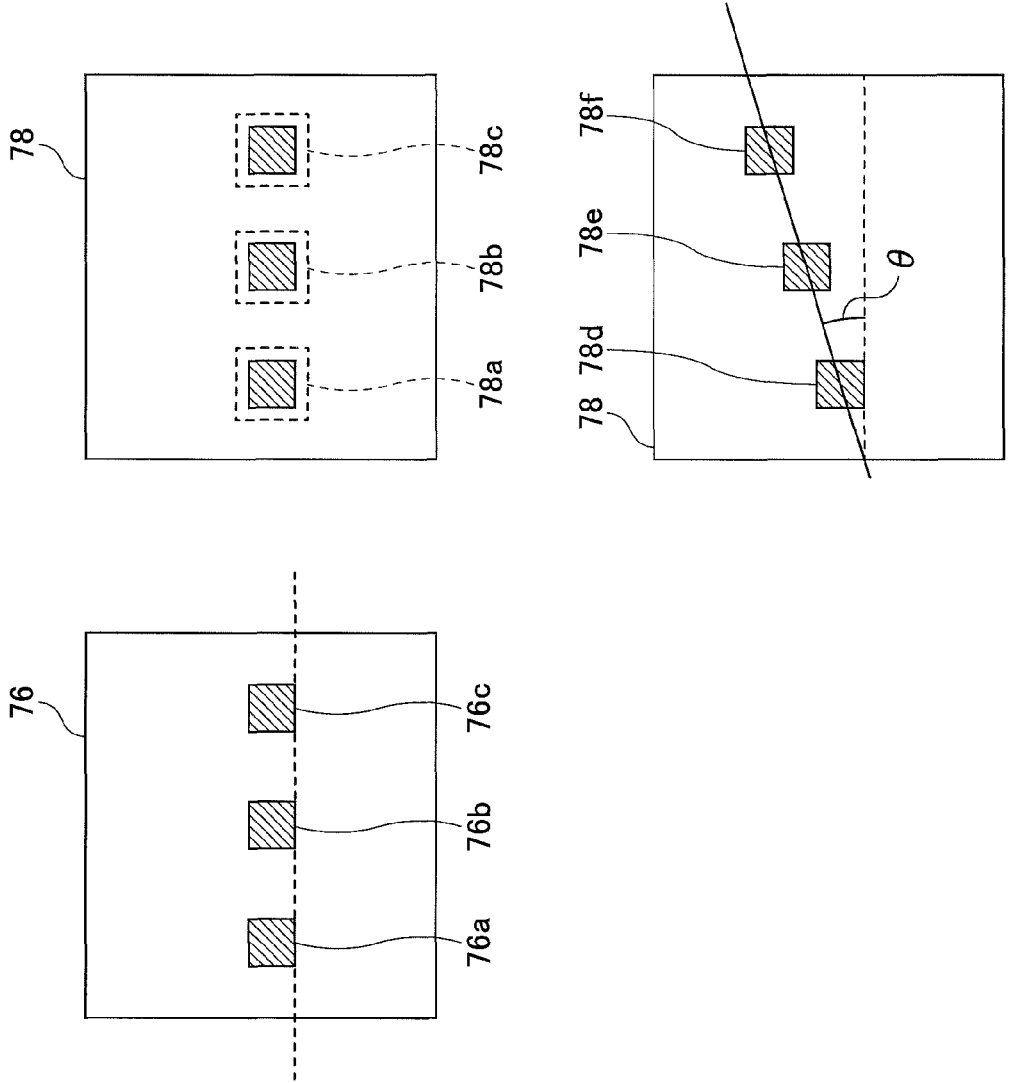

STEREO CAMERA APPARATUS AND METHOD OF OBTAINING IMAGE

BACKGROUND OF THE INVENTION

1. Field of the Invention

The present invention relates to a stereo camera apparatus for distance measurement and more specifically, to a stereo camera apparatus for distance measurement capable of correcting a shift generated between a left image sensor and a right image sensor.

2. Description of the Related Art

With improvement of image processing techniques, cameras with high performance have become relatively low priced. Therefore, cameras are applied to many areas.

For example, conventionally, in order to aid a driver of an automobile not to crash or to control the space between one's own automobile and an obstacle in front, a millimeter wave radar is mounted on the automobile to detect the obstacle in front for alerting a driver or controlling the automobile.

There has been an attempt to actualize this technique with a camera. When actualizing the technique with a camera, a stereo camera is mounted on an automobile to obtain a parallax image of an obstacle in front. Further, an image processing unit calculates the distance to the obstacle based on the parallax image obtained by the stereo camera. After the distance is determined, the same aid for a driver is possible.

FIG. 1 is a view for explaining a principle of distance measurement by a stereo camera in which a left camera C0 (left image sensor) and a right camera C1 (right image sensor) are positioned parallel to each other.

The left camera C0 and the right camera C1 are positioned at a distance B from each other. The focal lengths, the optical centers, and the image surfaces for the left camera C0 and the right camera C1 are as follows.
(For the Left Camera C0)
The focal length is f, the optical center is $O_0$ and the image surface is $s_0$.
(For the Right Camera C1)
The focal length is f, the optical center is $O_1$ and the image surface is $s_1$.

An image of an object "A" that is positioned at a distance "d" in the optical axis direction from the optical center $O_0$ of the camera C0 is focused on a point $P_0$ which is a node of a line A-$O_0$ and the image surface $s_0$.

On the other hand, for the right camera C1, an image of the same object "A" is focused on a point $P_1$ on the image surface $s_1$. Here, a node of a line that passes through the optical center $O_1$ of the right camera C1 and is parallel to the line A-$O_0$, and the image surface $s_1$ is assumed as a point $P_0'$, and the distance between the point $P_0'$ and the point $P_1$ is assumed as a distance "p".

The position of the point $P_0'$ on the image surface $s_1$ corresponds to the position of the point $P_0$ on the image surface $s_0$ of the camera C0, so that the distance "p" expresses a shift amount of positions of the same object in the images taken by two different cameras (the left camera C0 and the right camera C1) and the distance "p" is so called a "parallax".

In this case, as a triangle defined by A-$O_0$-$O_1$ and a triangle defined by $O_1$-$P_0'$-$P_1$ are orthomorphic, the following equation is obtained.

$$d = Bf/p$$

When the distance B (base line length) between the left camera C0 and the right camera C1, and the focal length "f" are known, the distance "d" can be obtained from the parallax "p".

As described above, for the distance measurement by the stereo camera, principally, the optical axes of two cameras are presumed to be parallel to each other. However, for the actual stereo camera, it is difficult to have the optical axes of the two cameras strictly parallel because of structural tolerance, variation with time by temperature or vibration, or the like. Therefore, a technique to correct images is important and a technique to electronically correct a shift in images taken by the stereo camera is disclosed in Japanese Laid-open Patent Publication No. 11-325890, for example.

Japanese Laid-open Patent Publication No. 11-325890 discloses an image correction apparatus in which an initial position of a base marker (for example, a specific position at a front edge of a hood of a car) within a field of vision of a stereo camera is stored, and then one of the images is shifted in the upward, downward, leftward, or rightward to correct the shift of the base marker in the images taken for the distance measurement.

Here, for obtaining an image, a rolling shutter (or line scan) in which pixels in each scanning line of a frame of an image are sequentially exposed, and a global shutter in which all the pixels in a frame of an image are exposed at the same time, are proposed. Many cameras including a Complementary Metal Oxide Semiconductor (CMOS) type image sensor adopt the rolling shutter to reduce electrical power consumption.

FIG. 2 is a view for explaining an example of operational timing of a rolling shutter.

A horizontal axis expresses time where the time passes from the left-side to the right-side. An "R" (row) and a "C" (column) express a coordinate position of each pixel. As shown in FIG. 2, the CMOS image sensor adopting the rolling shutter sequentially reads out pixel values of pixels at each of the columns in each of the rows. Concretely, the CMOS image sensor first exposes a pixel at the first column in the first row (R1C1) to output its pixel value, exposes a next pixel at the second column in the first row (R1C2) to output its pixel value, and then sequentially exposes each of the pixels in the first row to output their pixel values. When the pixel values of all of the pixels in the first row are output, the CMOS image sensor sequentially exposes each of the pixels in the second row to output their pixel values.

Therefore, there is a time difference in exposing (or obtaining) the pixel values for the pixels. For example, when the number of the pixels in the first row is "M", the time difference in exposing the pixel values for the pixels at the same column in the first row and the second row becomes a product of "pixel clock" and "M".

Because of the time difference, for the camera adopting the rolling shutter, when taking an image of an object moving fast in the horizontal direction, the object is distorted in the oblique direction in the image (hereinafter, this phenomenon is referred to as a distortion of a moving object).

FIG. 3 is a view for explaining an example of a distortion generated by the rolling shutter. FIG. 3 shows an object 50 having a rectangular shape and moving rightward as shown by the arrow, and an image 52 of the object 50 taken by a camera adopting the rolling shutter.

As described above, the pixel values of the pixels in the lower rows are obtained later. Therefore, the positions of the pixels at the lower rows are shifted rightward as the object 50 is moving rightward to distort the object 50 to be shown like a parallelogram 50a in the image 52.

The distortion of a moving object may be corrected by image processing. However, according to the method disclosed in Japanese Laid-open Patent Publication No. 11-325890, it is difficult to correct the distortion of a moving object.

FIG. 4A and FIG. 4B are views for explaining an example of a problem in a correction of the distortion of a moving object.

FIG. 4A shows a left-side image 54 and a right-side image 56 respectively obtained by the left camera C0 and the right camera C1 (see FIG. 1) of a stereo camera, before a correction.

In this case, it is assumed that the right camera C1 that obtained the right-side image 56 is positioned to face in a bit upper direction relative to the left camera C0 that obtained the left-side image 54. Therefore, the object 55a (or 55b) which is common for the left-side image 54 and the right-side image 56 is positioned "a" rows lower in the right-side image 56 than in the left-side image 54.

The object 55a, which is not a moving object, has a rectangular shape. As for the object 55a, distortion of a moving object is not generated.

FIG. 4B shows the left-side image 54 and an example of a corrected image 56a of the right-side image 56 obtained by correcting the right-side image 56 in accordance with a method such as disclosed in Japanese Laid-open Patent Publication No. 11-325890. Here, by the correction, the right-side image 56 obtained by the right camera C1 is vertically shifted upward for "a" rows so that the objects in the left-side image 54 and the corrected image 56a are positioned at the same height.

However, such a correction is performed after all the pixels in a frame of the images are obtained, so that the time difference is not corrected. Therefore, the pixels in the first row of the left-side image 54 obtained by the left camera C0 corresponds to the pixels in the (a+1)th row of the corrected image 56a of the right-side image 56 obtained by the right camera C1. It means that, when assuming that the left camera C0 and the right camera C1 start obtaining the left-side image 54 and the right-side image 56 at the same time, there is a time difference corresponding to "a" rows between the pixels in the same row (at the same height) of the left-side image 54 and the corrected image 56a.

Thus, if the object is a moving object like the object 55b shown by dotted lines in FIG. 4A, where the positions of the pixels at the lower rows are shifted rightward, a difference other than the parallax is generated between the objects 55b in the left-side image 54 and the right-side image 56 in the horizontal direction. This difference is not corrected even after the correction by the method as disclosed in Japanese Laid-open Patent Publication No. 11-325890 is performed, as shown in FIG. 4B.

Thus, according to the above method, if images of an object moving fast in the horizontal direction are obtained, because of the distortion of a moving object described above with reference to FIG. 3, the detected parallax even after using the method disclosed in Japanese Laid-open Patent Publication No. 11-325890 is performed, is not accurate and therefore, the distance calculated based on the parallax is not accurate either.

SUMMARY OF THE INVENTION

The present invention is made in light of the above problems, and provides a stereo camera apparatus adopting image sensors by which the exposure is sequentially performed for each of the pixels for a distance measurement, capable of correcting the distortion of a moving object in addition to a shift of images caused by a shift of optical axes.

According to an embodiment, there is provided a stereo camera apparatus for obtaining distance information of an object, including a camera unit that includes a left image sensor and a right image sensor which are positioned parallel to each other to respectively obtain a left-side image and a right-side image, each of the images being composed of a frame including plural pixels of plural rows and plural columns, the left image sensor and the right image sensor sequentially exposing the pixels of the rows from an upper row to a lower row in the frames, respectively; a shift amount detection unit that detects a relative positional shift amount in the vertical direction between a left-side image and a right-side image respectively obtained by the left image sensor and the right image sensor; and a timing control unit that changes a starting time of exposing the frame by the left image sensor or by the right image sensor based on the positional shift amount in the vertical direction detected by the shift amount detection unit.

According to an embodiment, there is provided a method of obtaining an image obtained by a stereo camera apparatus including a left image sensor and a right image sensor, each of the sensors sequentially exposing the pixels of rows from an upper row to a lower row in a frame, including detecting a relative positional shift amount in a vertical direction between a left-side image and a right-side image respectively obtained by the left image sensor and the right image sensor; and changing a starting time of exposing the frame by the left image sensor or by the right image sensor based on the positional shift amount in the vertical direction detected in the detecting the relative positional shift amount in the vertical direction.

BRIEF DESCRIPTION OF THE DRAWINGS

Other objects, features and advantages of the present invention will become more apparent from the following detailed description when read in conjunction with the accompanying drawings.

FIG. 4A and FIG. 4B are views for explaining an example of a problem in correction of a distortion of a moving object;

FIG. 8 shows an example of operational timing of a CMOS image sensor;

FIG. 9A and FIG. 9B are views for explaining an example of a detection of the shift amount between two images;

FIG. 11A to FIG. 11D are views for explaining an example of a correction of the vertical shift;

FIG. 13A and FIG. 13B are views for explaining an example of a shift of a marker by the rotation of the left camera and the right camera around their optical axes;

DETAILED DESCRIPTION OF THE PREFERRED EMBODIMENTS

Figure 1:
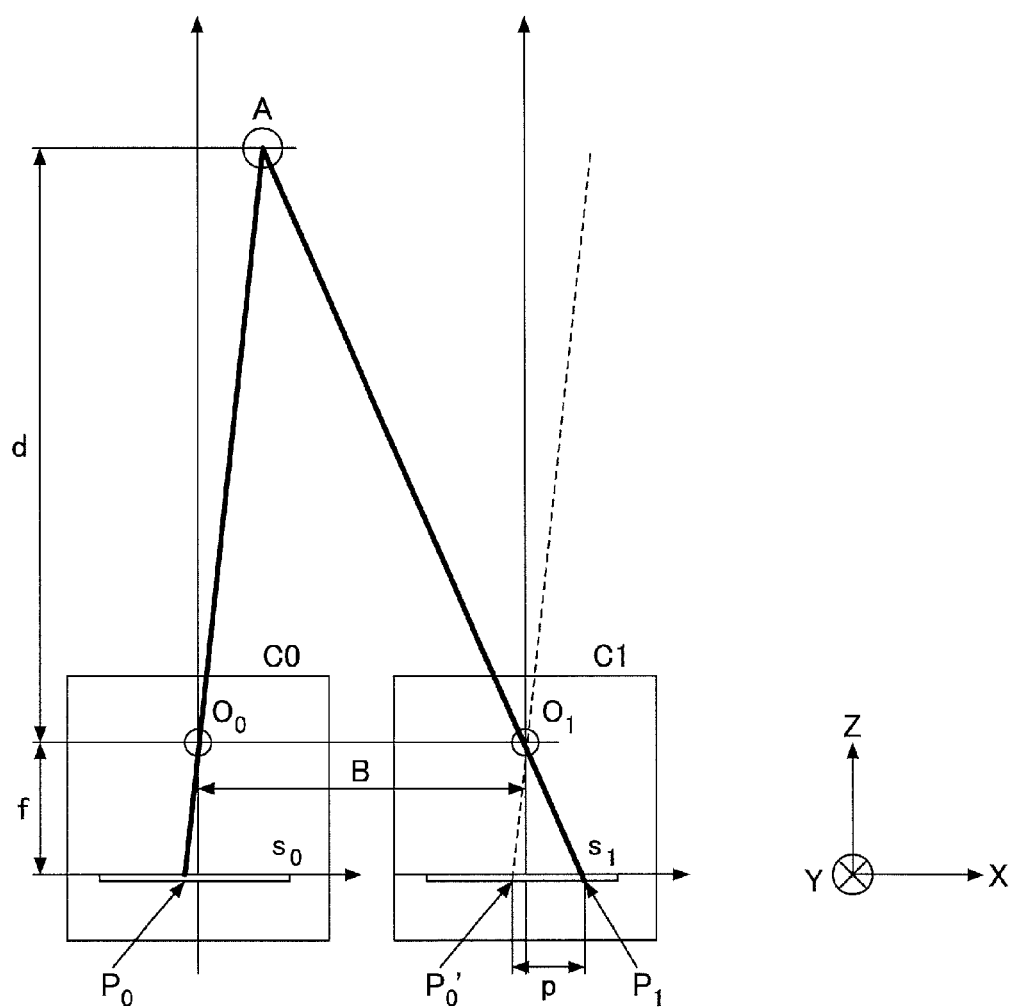
FIG. 1 is a view for explaining a principle of a distance measurement by a stereo camera in which a left camera and a right camera are positioned parallel to each other.
Figure 2:
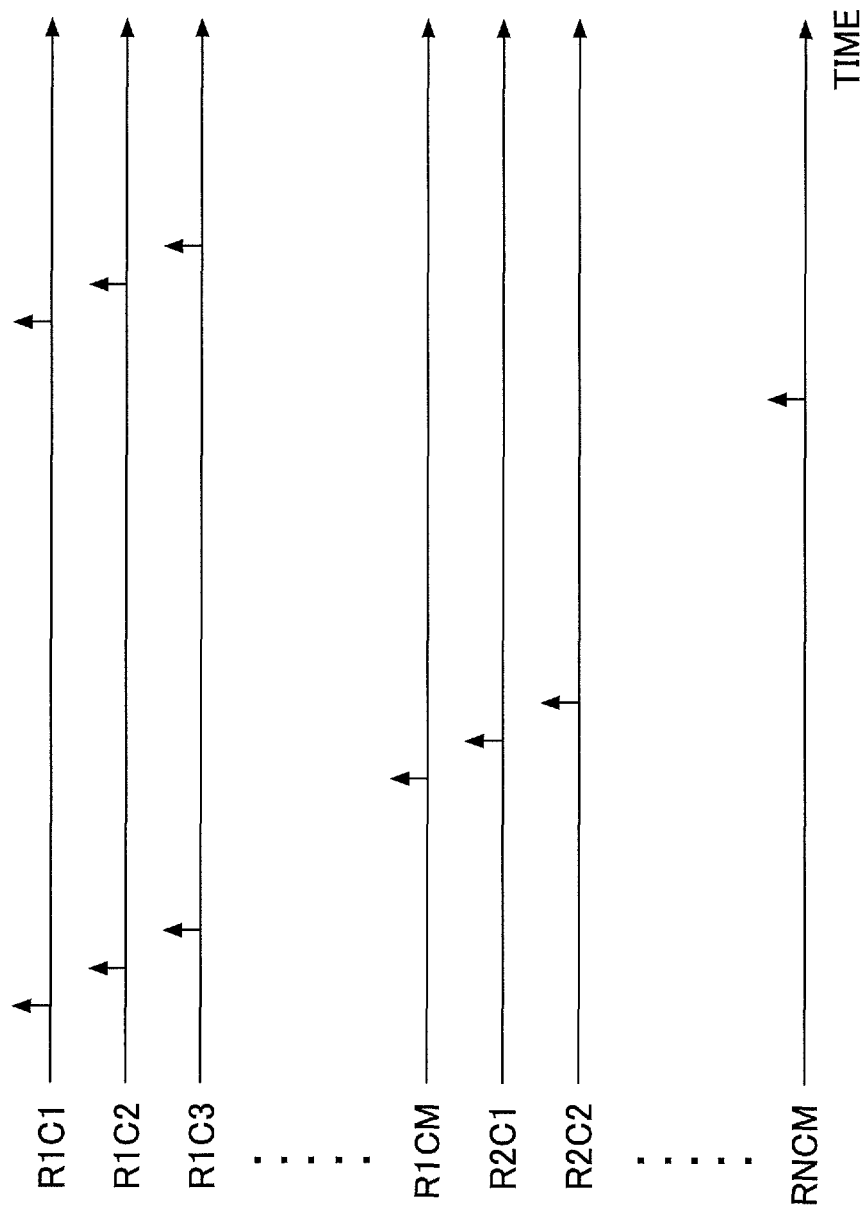
FIG. 2 is a view for explaining an example of an operational timing of a rolling shutter.
Figure 3:
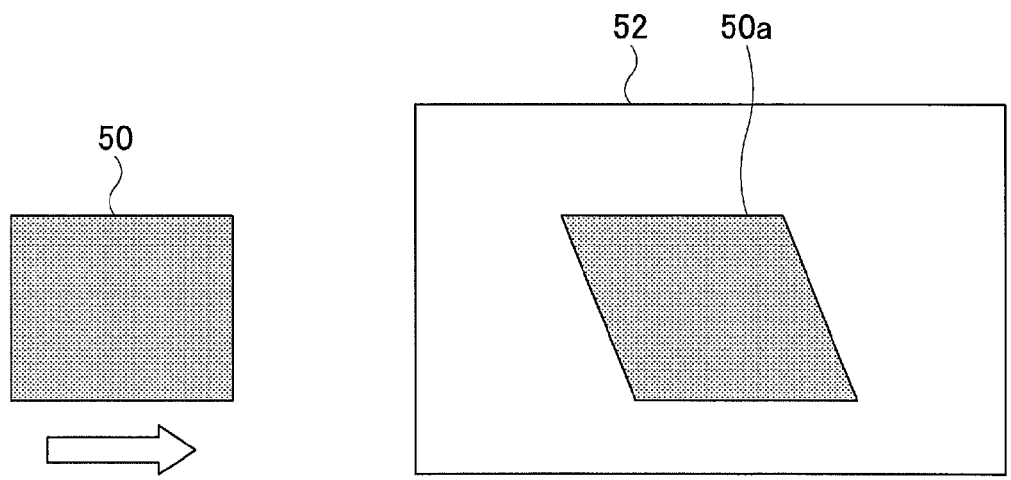
FIG. 3 is a view for explaining an example of a distortion generated by a rolling shutter.

The invention is described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

Figure 5:
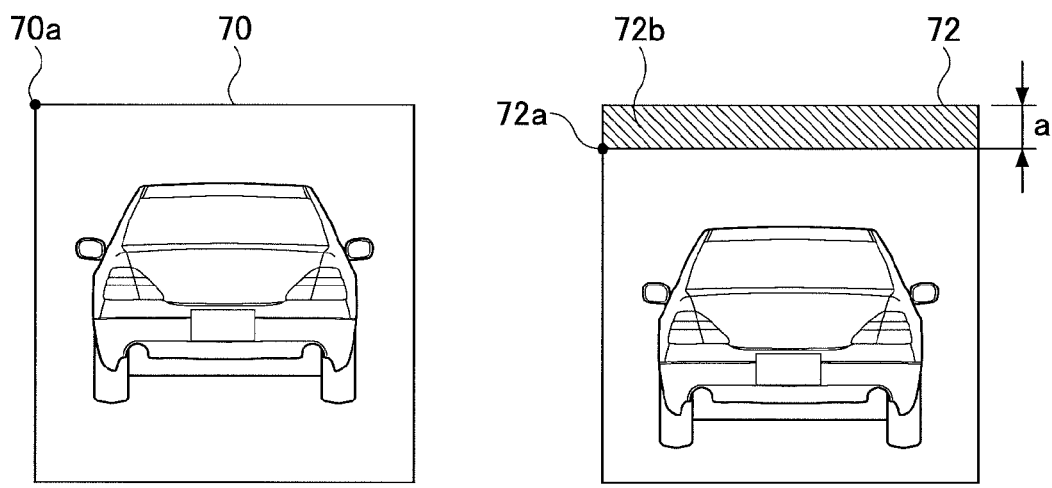
FIG. 5 is a view for explaining an example of a correction of shift in images obtained by a stereo camera apparatus of an embodiment.

FIG. 5 is a view for explaining an example of a correction of a shift between a left-side image 70 and a right-side image 72 caused by a shift of optical axes obtained by a stereo camera apparatus of an embodiment. The stereo camera apparatus of the embodiment includes a left CMOS image sensor and a right CMOS image sensor.

(1) The stereo camera apparatus detects a shift amount "a" rows in the vertical direction between the left-side image 70 and the right-side image 72 respectively obtained by the left CMOS image sensor and the right CMOS image sensor.

(2) The stereo camera apparatus delays a frame start pulse supplied to either of the left CMOS image sensor and the right CMOS image sensor (in this case the left CMOS image sensor) for a time corresponding to the "a" rows.

When the frame start pulse supplied to the left CMOS image sensor is delayed for the time corresponding to the "a" rows, the right CMOS image sensor starts exposing the pixels earlier than the left CMOS image sensor for the time. Thus, the pixels in the hatched area 72b of the right-side image 72 are previously exposed before the exposing of the pixels of the left-side image 70 is started. Then, the pixel 70a at the leftmost in the first row of the left-side image 70 and the pixel 72a at the leftmost in the (a+1)th row of the right-side image 72 are exposed at the same time. Thus, even when the "a" rows shift is generated in the vertical direction, the pixels corresponding to the same object are exposed almost at the same time. With this operation, even when the object is moving, the influence of the distortion of a moving object can be reduced.

(3) The right-side image 72 is shifted in the vertical direction for "a" rows before the distance measurement. With this operation, there is no difference between the left-side image 70 and the corrected image of the right-side image 72 other than the parallax. Therefore, the stereo camera apparatus can detect the distance of the object accurately.

According to the stereo camera apparatus of the embodiment, by adjusting the timing of driving the left CMOS image sensor and the right CMOS image sensor based on the positional shift amount of the objects in the vertical direction, the time difference generated between the objects in the left-side image 70 and the right-side image 72 can be corrected in addition to correcting a mechanical shift such as shift of optical axes by electronic image processing. Therefore, the distance of the object can be accurately calculated.

(Structure)

Figure 6:
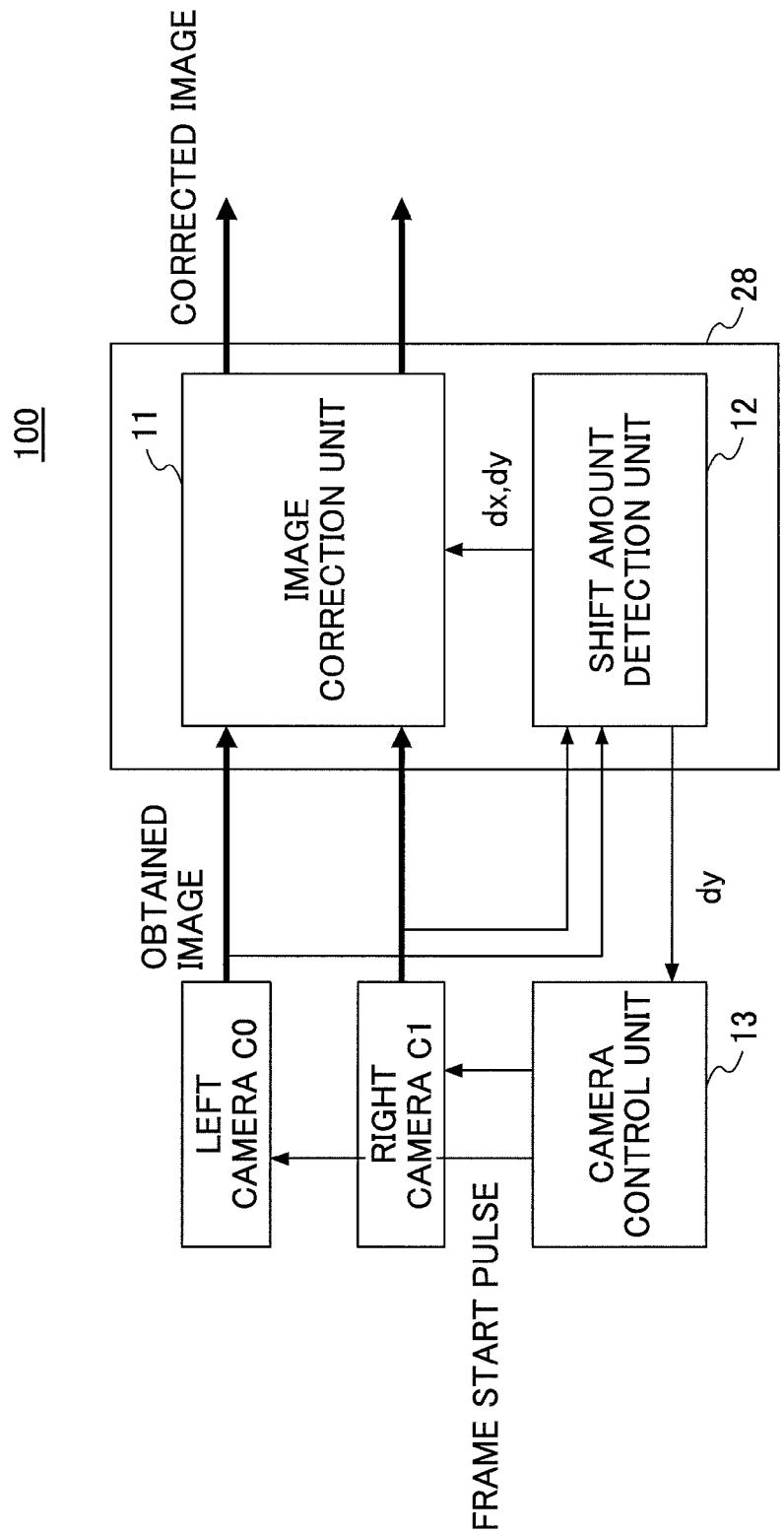
FIG. 6 is a block diagram showing an example of a hardware structure of the stereo camera apparatus.

FIG. 6 is a block diagram showing an example of a hardware structure of a stereo camera apparatus 100.

The stereo camera apparatus 100 includes a left camera C0, a right camera C1, a camera control unit 13 and a digital signal processing unit 28. The digital signal processing unit 28 includes an image correction unit 11 and a shift amount detection unit 12.

The left camera C0 and the right camera C1 are positioned parallel to each other. The left camera C0 and the right camera C1 respectively obtain images of an object. In this embodiment, the left camera C0 and the right camera C1 also respectively obtain reference images including marker objects.

The shift amount detection unit 12 obtains the reference images obtained by the left camera C0 and the right camera C1 and detects a shift amount (especially in the vertical direction) between the left camera C0 and the right camera C1 based on the reference images.

The camera control unit 13 (timing control unit) changes the starting time of obtaining the image of either of the left camera C0 and the right camera C1 based on the shift amount detected by the shift amount detection unit 12.

The image correction unit 11 obtains the images obtained by the left camera C0 and the right camera C1 and corrects the images based on the shift amount detected by the shift amount detection unit 12. Each of the components will be explained in detail.

(Left Camera C0 and Right Camera C1)

Figure 7:
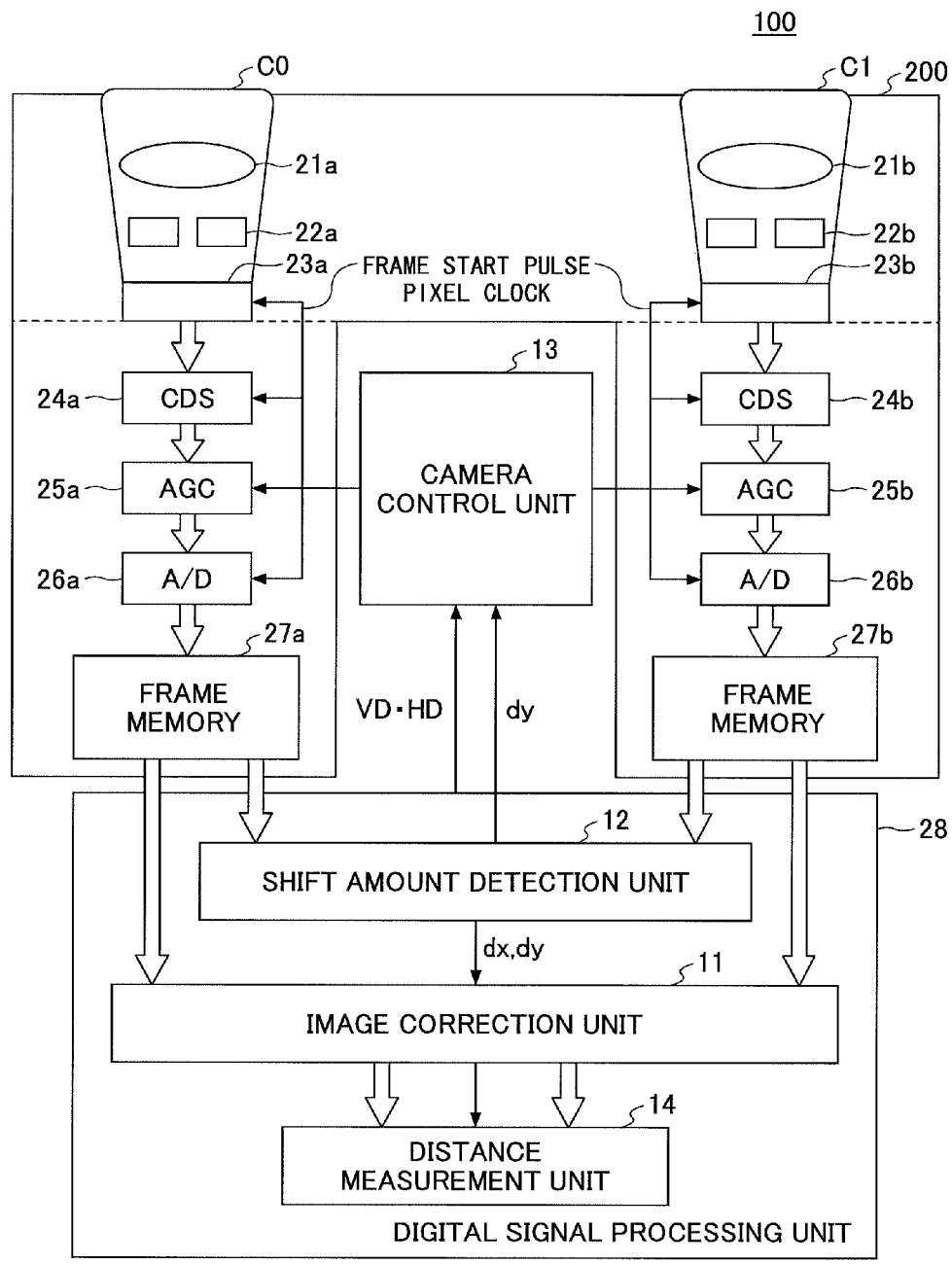
FIG. 7 shows an example of a left camera and a right camera.

FIG. 7 shows an example of the left camera C0 and the right camera C1 included in a camera unit 200.

The left camera C0 includes a lens 21a, a lens diaphragm 22a, a CMOS image sensor 23a which is the rolling shutter, a correlated double sampling (CDS) unit 24a, an automatic gain control (AGS) unit 25a, an analog/digital (A/D) converter 26a, and a frame memory 27a. Similarly, the right camera C1 includes a lens 21b, a lens diaphragm 22b, a CMOS image sensor 23b which is the rolling shutter, a CDS unit 24b, an AGS unit 25b, an A/D converter 26b, and a frame memory 27b.

The left camera C0 and the right camera C1 are positioned such that the optical axes of the lens 21a and the lens 21b are parallel with each other and imaging surfaces of the CMOS image sensor 23a and the CMOS image sensor 23b are aligned with each other and orthogonal to the respective optical axes. However, as described above, there is a small error because of a limitation in accuracy in the parallel relationship.

In this embodiment, the left camera C0 and the right camera C1 have the same structure and perform the same operation. Hereinafter, the structure and the operation of the left camera C0 are explained.

In this embodiment, the CMOS image sensor 23a is composed of plural image sensors of plural rows and plural columns to which plural pixels of plural rows and plural columns in an obtained image correspond. The CMOS image sensor 23a is operated by inputting two signals including a pixel clock and a frame start pulse (frame start signal) output by the camera control unit 13. The CMOS image sensor 23a outputs an analog image signal. The image signal output by the CMOS image sensor 23a is output to the CDS unit 24a by which noise is removed by the correlated double sampling, output to the AGS unit 25a by which gain control is performed in accordance with the magnitude of the image signal, and then output to the A/D converter 26a by which the analog image signal is converted to a digital image signal. The image signal is then stored in the frame memory 27a which is capable of storing the entirety of the image signal of the image sensors (pixels) of the CMOS image sensor 23a. The same operation is performed for the right camera C1.

The digital signal processing unit 28 further includes a distance measurement unit 14 that calculates the distance to an object based on the images (image signals stored in the frame memory 27a and the frame memory 27b) obtained by the left camera C0 and the right camera C1. Further, the digital signal processing unit 28 may convert the format of the image signals to be displayed on a display such as a liquid crystal display.

The digital signal processing unit 28 may be a large scale integration (LSI) that includes a digital signal processor (DSP), a central processing unit (CPU), a read only memory (ROM), a random access memory (RAM) or the like. The image correction unit 11, the shift amount detection unit 12 and the distance measurement unit 14 may be actualized by software or hardware of the digital signal processing unit 28, for example. The structure shown in FIG. 7 is an example and alternatively, the camera control unit 13 may also be included in the digital signal processing unit 28.

The digital signal processing unit 28 outputs pulses of a horizontal driving signal HD, a vertical driving signal VD and a clock signal to the camera control unit 13. Alternatively, the camera control unit 13 may generate the horizontal driving signal HD and the vertical driving signal VD.

The camera control unit 13 includes a timing generator and a clock driver to generate a timing pulse such as a pixel clock or a frame start pulse for driving the CMOS image sensor 23a and the CMOS image sensor 23b based on the horizontal driving signal HD, the vertical driving signal VD and the clock signal.

FIG. 8 shows an example of an operational timing of the CMOS image sensor 23a. The "frame start pulse" is a pulse for controlling a start of exposing pixels of a frame. The "pixel clock" is a pulse for controlling a timing of exposing (reading out a value of) a pixel of the CMOS image sensor 23a. After the frame start pulse becomes ON, at the timing of the first pixel clock, the image sensor of the CMOS image sensor 23a at the first column in the first row (pixel (0,0)) starts exposure. After a predetermined exposure time "t", the image sensor outputs the electric charge obtained by the photoelectric conversion to the CDS UNIT 24 or the like.

Similarly, with the timing of the pixel clock, each of the image sensors of the CMOS image sensor 23a performs the same operation and after the predetermined exposure time "t", each of the image sensors sequentially output the values (electric charge) of the respective pixels.

The difference of the timing "T" between the image sensors at the same column in the adjacent rows for starting the exposure becomes a product "wp" of a width "w" of the image (the number of pixels in the horizontal direction (including blanks)) and a time "p" of the pixel clock for one pixel. Thus, the image sensor at the same column in the adjacent lower row starts exposing "wp" later than the image sensor at the same column in the adjacent upper row.

(Shift Amount Detection Unit 12)

The shift amount detection unit 12 detects a small shift between the left camera C0 and the right camera C1 based on the image signals stored in the frame memories 27a and 27b.

FIG. 9A and FIG. 9B are views for explaining an example of a detection of the shift amount between two images.

A manufacturer such as an automobile manufacturer, a camera manufacturer or the like may set a specified marker object within a field of vision of the left camera C0 and the right camera C1 of the stereo camera apparatus 100 such as on a hood of an automobile for detecting the shift between the left camera C0 and the right camera C1. The marker object may be a seal or the like specified for detecting the shift amount, or may be a part of the hood (an outer edge of the hood), a protruding object (exhaust nozzle of washer or the like) in the field of vision to maintain the design of the automobile. The manufacturer such as the automobile manufacturer, the camera manufacturer or the like attaches the camera unit 200 to the automobile and adjusts the optical axes of the left camera C0 and the right camera C1. At that time, the shift amount detection unit 12 may store the positions of the marker object in the images obtained by the left camera C0 and the right camera C1 in its memory area. Further, in addition to the positions, the shift amount detection unit 12 may store the images of the marker object (the entire field of vision or only the marker object) obtained by the left camera C0 and/or the right camera C1 as a template.

The shift amount detection unit 12 has the left camera C0 and the right camera C1 take reference images including the marker object in order to detect the positional shift amount between the left camera C0 and the right camera C1.

The shift amount detection unit 12 may, for example, constantly (every time the ignition switch of the automobile is ON, every week, every month or the like) or at the time of periodic inspection by a dealer, detect the positional shift amount based on the positions of the marker object in the reference images obtained by the left camera C0 and the right camera C1.

FIG. 9A shows an example of reference images 60 and 62 respectively obtained by the left camera C0 and the right camera C1 including a marker object 64. The position of the marker object 64 in the reference image 60 obtained by the left camera C0 is pl(xl, yl) and the position of the marker object 64 in the reference image 62 obtained by the right camera C1 is pr(xr, yr).

The positions of the marker object 64 in the reference image 60 and the reference image 62 can be specified by pattern matching using the template of an image of the maker object 64 and the positions of the marker object previously stored in the shift amount detection unit 12 as described above.

FIG. 9B shows the relationship between the position pl(xl, yl) of the marker object 64 in the reference image 60 and the position pr(xr, yr) of the marker object 64 in the reference image 62. The difference in the horizontal direction "dx" and the difference in the vertical direction "dy" of the position pr(xr, yr) from the position pl(xl, yl) becomes as follows.

$$dx = xr - xl$$

$$dy = yr - yl$$

In this example, rightward is a positive direction in the horizontal direction and downward is a positive direction in the vertical direction. Thus, for the case shown in FIG. 9A and FIG. 9B, the differences "dx" and "dy" become negative values.

For the stereo camera, in order to obtain an accurate parallax, the shift amount between the images in the vertical direction should be "0". Therefore, the difference "dy" is the shift amount to be corrected in the vertical direction.

However, the shift amount between the images in the horizontal direction does not become "0" even for an accurate parallel stereo camera because of a predetermined parallax. The value "p0" (a predetermined appropriate positional shift amount) of the predetermined parallax for the camera unit 200 can be obtained by calibration or the like. The value "p0" of predetermined parallax may be stored in the shift amount detection unit 12. The difference "dx" shown in FIG. 9B includes the predetermined parallax. Therefore, the shift amount "dx'" to be corrected in the horizontal direction can be expressed as follows.

$$dx' = dx - p0$$

Here, it is not necessary to use the target object. Instead, using pattern matching, the shift amount detection unit 12 can detect the horizontal shift amount "dx" and the vertical shift amount "dy". The shifting amounts in the horizontal direction and in the vertical direction between the reference images obtained by the left camera C0 and the right camera C1 to have the largest correlation value by the pattern matching are "dx" and "dy". The shift amount to be corrected in the vertical direction is same as "dy".

As described above, the horizontal shift amount "dx" does not become zero even for an accurate stereo camera because of a parallax. The shift amount "dx'" to be corrected may be calculated as follows instead of storing the predetermined parallax "p0" as described above. Other initial reference images including the hood of the automobile or the like obtained by the left camera C0 and the right camera C1 at the time of calibration are stored in the shift amount detection unit 12. Then by comparing the currently obtained reference images with the stored initial other reference images by pattern matching, the shift amount "dx'" to be corrected can be obtained. Hereinafter, in order to simplify the explanation, the shift amount in the horizontal direction is simply referred to as "dx", however, the value may be "dx'".

The shift amount detection unit 12 outputs the detected shift amounts to the image correction unit (the horizontal shift amount "dx" and the vertical shift amount "dy"), and to the camera control unit 13 (only the vertical shift amount "dy").

The shift amount detection unit 12 detects the rotation amount of the left camera C0 and the right camera C1 around their optical axes, the variation with time or the like in addition to the shift amount in the vertical or horizontal directions, as will be explained in detail later.

(Camera Control Unit 13)

The camera control unit 13 generates frame start pulses of the left camera C0 and the right camera C1 based on the vertical shift amount "dy". The camera control unit 13 corrects the start timing of the frame of the left camera C0 or the right camera C1 based on the vertical shift amount "dy" detected by the shift amount detection unit 12.

Figure 10:
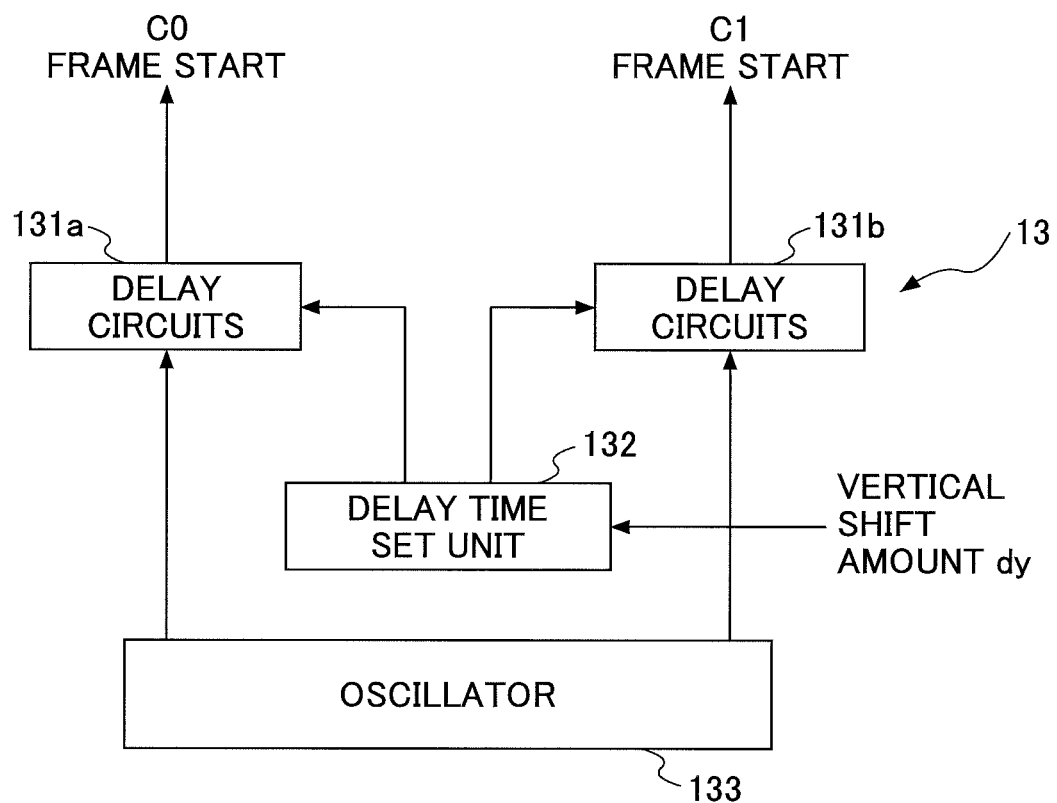
FIG. 10 is a block diagram showing an example of the structure of a camera control unit.

FIG. 10 is a block diagram showing an example of the structure of the camera control unit 13.

The camera control unit 13 includes a delay time set unit 132, delay circuits 131a and 131b respectively corresponding to the left camera C0 and the right camera C1, and an oscillator 133.

Here, it is assumed that the camera control unit 13 outputs the frame start pulse every 1/30 of a second in order to output 30 frames per second. The oscillator 133 is configured to output a frame start pulse of 30 Hz. The camera control unit 13 delays the frame start pulse in accordance with the vertical shift amount "dy".

The delay time set unit 132 sets the vertical shift amount "dy" output by the shift amount detection unit 12.

The delay time set unit 132 converts the vertical shift amount "dy" to a delay time and sets it in the delay circuit 131a or 131b. Thus, the delay circuit 131a or 131b outputs the frame start pulse when the set delay time elapses.

When the vertical shift amount "dy" is a positive value, the delay time set unit 132 sets the delay time in the delay circuit 131a to delay the timing of outputting the frame start pulse of the left camera C0 for "dy" rows. At this time, the timing of outputting the frame start pulse of the right camera C1 is not delayed.

On the other hand, when the vertical shift amount "dy" is a negative value, the delay time set unit 132 sets the delay time in the delay circuit 131b to delay the timing of outputting the frame start pulse of the right camera C1 for "dy" rows. At this time, the timing of outputting the frame start pulse of the left camera C0 is not delayed.

With the above operation, as shown in FIG. 4A and FIG. 4B, when the image 56 is shifted upward in the vertical direction, the frame start of the left camera C0 is delayed for "a" rows, for example. Thus, the first row of the image 54 obtained by the left camera C0 and the (a+1)th row of the image 56a obtained by the right camera C1 are obtained at the same time. Therefore, the influence of the distortion of a moving object by the rolling shutter on the distance measurement can be reduced.

FIG. 11A to FIG. 11D are views for correcting the vertical shift.

Figure 11A:
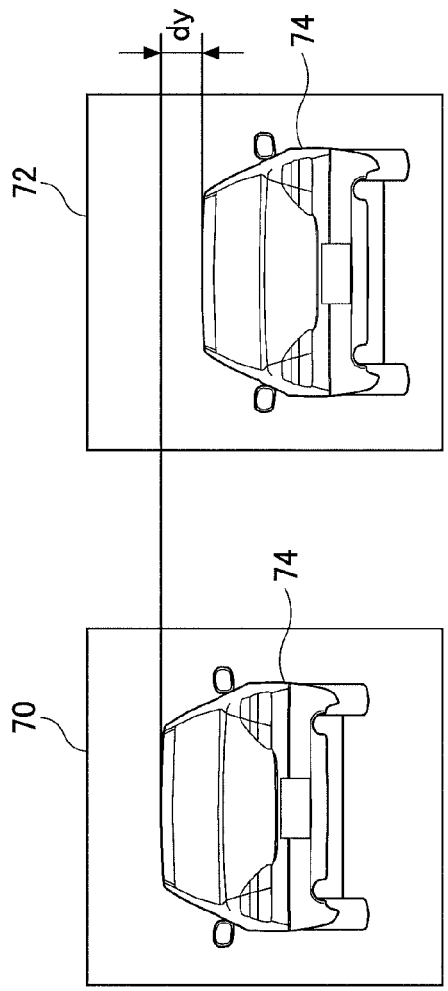

As shown in FIG. 11A, in this case, the object 74 in the right-side image 72 is positioned "dy" rows lower than the object 74 in the left-side image 70. Therefore, the delay time set unit 132 of the camera control unit 13 sets the vertical shift amount "dy", which is a positive value. Thus, the timing of outputting the frame start pulse of the left camera C0 should be delayed. Therefore, the delay time set unit 132 sets a delay time corresponding to the vertical shift amount "dy" in the delay circuit 131a corresponding to the left camera C0 (left-side image 70).

Figure 11B:
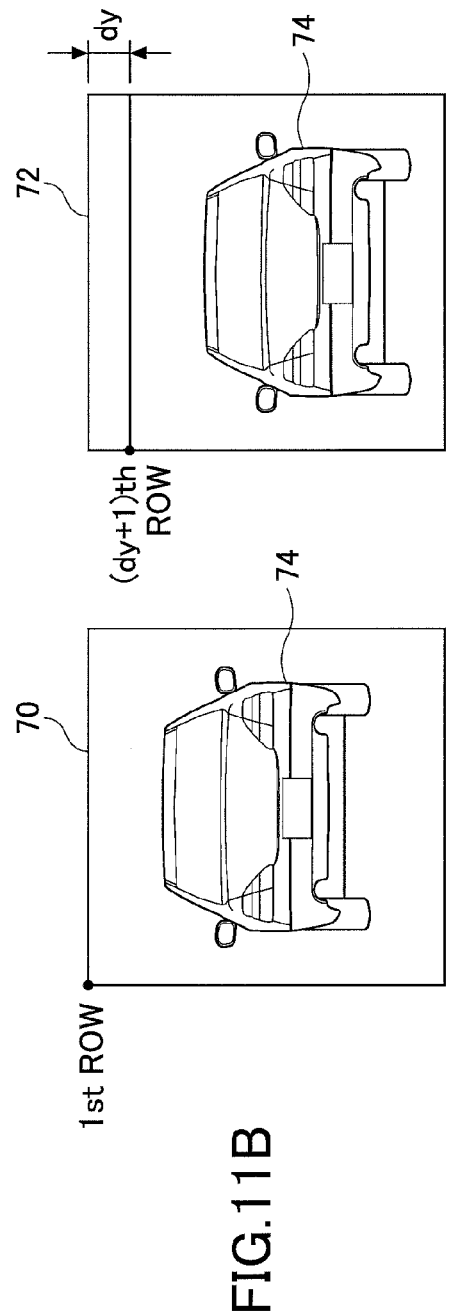

With the above operation, as shown in FIG. 11B, the frame start pulse is output to the right camera C1 prior to the left camera C0, and pixel values of pixels in a first row of the image of the right camera C1 are sequentially read out. When the right camera C1 reads out the pixel values of the pixels for "dy" rows, the camera control unit 13 outputs the frame start pulse to the left camera C0. With this, pixel values of the pixels of the first row of the left camera C0 and pixel values of the pixels of the "dy+1"th row of the right camera C1 are read out at the same time.

FIG. 11C shows the left-side image 70 and the right-side image 72 respectively stored in the frame memories 27a and 27b. The left-side image 70 and the right-side image 72 respectively obtained by the left camera C0 and the right camera C1 as they are, are respectively stored in the frame memories 27a and 27b. In other words, the shift in the vertical direction remains for the left-side image 70 and the right-side image 72. This shift will be corrected by the image correction unit 11. However, in this embodiment, the same point (for example a point 74a) of the object 74 in the left-side image 70 and the right-side image 72 is obtained by the left camera C0 and the right camera C1 at the same time.

FIG. 11D shows the left-side image 70 and the right-side image 72 in which the object 74 moves fast so that distortion of a moving object by the rolling shutter is generated.

When the object 74 moves fast, distortion of a moving object as shown is generated. However, by delaying the frame start pulse of the left camera C0 or the right camera C1 (the left camera C0 in this case) for a delay time corresponding to the shift amount "dy" rows, the corresponding rows of the left and right objects 74 are obtained at the same times. For example, the points 74a in the left-side image 70 and the right-side image 72, or the points 74b in the left-side image 70 and the right-side image 72 are obtained at the same times, respectively. Therefore, after the image correction unit 11 corrects the vertical shift of "dy", the distance measurement unit 14 can accurately detect the parallax even when the distortion of a moving object is generated so that the distance measurement can be accurately performed.

(Image Correction Unit 11)

The image correction unit 11 corrects the image by shifting the image signal in the horizontal direction and in the vertical direction based on the horizontal shift amount "dx" or the vertical shift amount "dy" detected by the shift amount detection unit 12. The image correction unit 11 corrects the image obtained by one of the left camera C0 and the right camera C1 with respect to the image of the other selected as a reference camera. In this case, the left camera C0 is assumed to be the reference camera. Therefore, the image correction unit 11 corrects the image obtained by the right camera C1.

In this case, when the vertical shift amount "dy" is a negative value, the image correction unit 11 shifts the positions of the entirety of the pixels of the image obtained by the right camera C1 downward for "dy", and when the vertical shift amount "dy" is a positive value the image correction unit 11 shifts the positions of the entirety of the pixels of the image obtained by the right camera C1 upward for "dy" For example, as shown FIG. 9B, when the vertical shift amount "dy" is a negative value, the image correction unit 11 shifts the positions of the pixels of the image 62 obtained by the right camera C1 downward (positive direction in the Y-axis) for "dy".

Similarly, for the shift in the horizontal direction, when the horizontal shift amount "dx" is a negative value, the image correction unit 11 shifts the positions of the entirety of the pixels of the image obtained by the right camera C1 rightward for "dx", and when the horizontal shift amount "dx" is a positive value, the image correction unit 11 shifts the positions of the entirety of the pixels of the image obtained by the right camera C1 leftward for "dx". For this correction of shifting the image for "dx" and "dy", affine transformation may be used, for example.

Figure 12A:
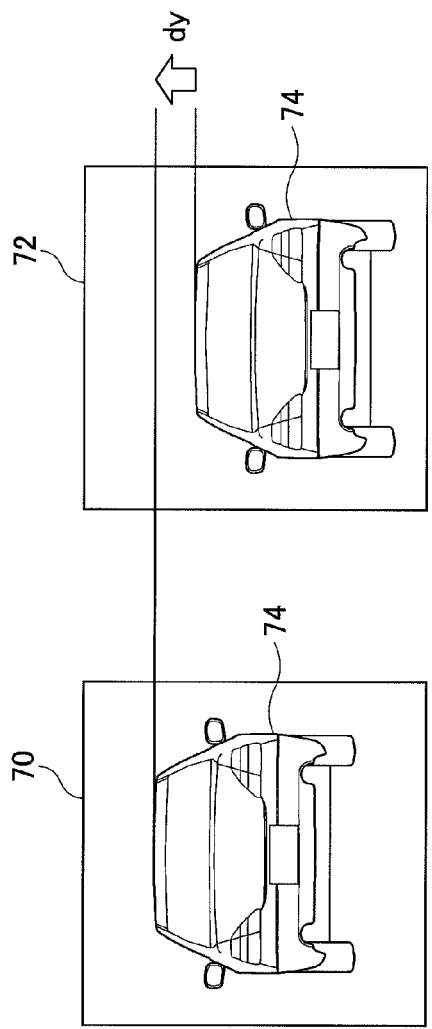
FIG. 12A and FIG. 12B are views for explaining an example of a correction of image.
Figure 12B:
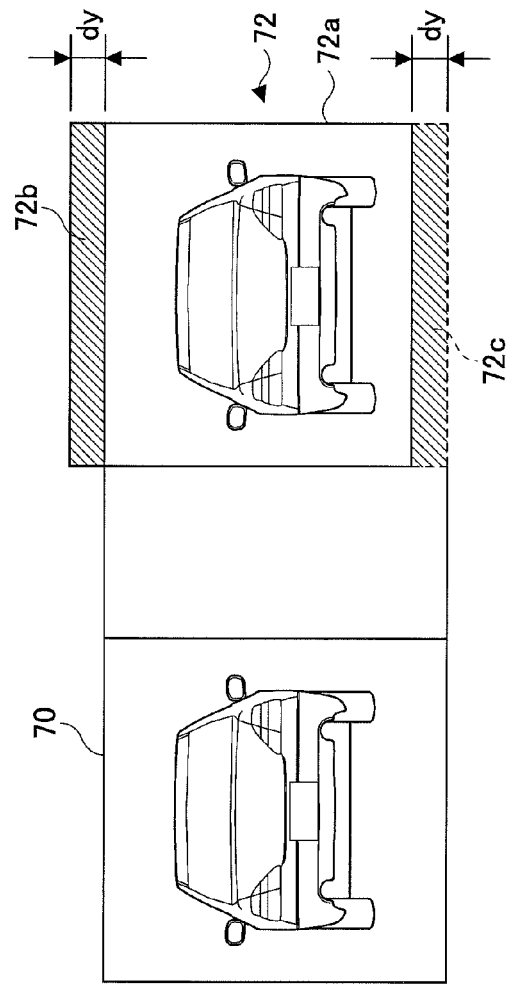

FIG. 12A and FIG. 12B are views for explaining an example of the correction of the image.

For the correction in the vertical direction, the right-side image 72 is shifted so that the object 74 in the left-side image 70 and the right-side image 72 are positioned at almost the same height in the vertical direction. In the case shown in FIG. 12A, the right-side image 72 is shifted upward for "dy".

By the correction of the right-side image 72, the pixel values of the pixels originally positioned at the upper part 72b (see FIG. 12B) overflow and cannot be stored in the frame memory 27b. The image correction unit 11 may remove the pixel values of the upper part 72b. On the other hand, the pixel values of the pixels to be positioned at the lower part 72c in the corrected image 72a are unknown. The image correction unit 11 may add a predetermined pixel value such as 255 (white), 0 (black) or the like, for example, to the pixels in the lower part 72c or may retain the pixel values of the pixels as unknown. Although it is not shown in the drawings, the correction of the right-side image 72 in the horizontal direction can be performed as well.

By the above correction, the left-side image 70 and the right-side image 72 (corrected image 72a) respectively obtained by the left camera C0 and the right camera C1 are prepared not to include differences other than a parallax.

Further, the image correction unit 11 may adjust the images in various ways in addition to correcting the vertical shift amount "dy" and the horizontal shift amount "dx" detected by the shift amount detection unit 12. For example, the image correction unit 11 may correct the rotation of the left camera C0 and the right camera C1 around their optical axes, distortion of an optical imaging system or the like in addition to the shift in the parallel directions.

FIG. 13A and FIG. 13B are views for explaining an example of a shift of a marker (or an object) by the rotation of the left camera C0 and the right camera C1 around their optical axes. Although the rotation of the left camera C0 and the right camera C1 around their optical axes may occur to the left camera C0 and the right camera C1, the relative rotation amount between the left camera C0 and the right camera C1 may be corrected.

The shift by the rotation can be obtained by detecting the rotation amount of a left-side image 76 and a right-side image 78 respectively obtained by the left camera C0 and the right camera C1. Similar to the method of obtaining distance information, which will be explained later, the shift amount detection unit 12 extracts two or more reference areas (three reference areas 76a, 76b, and 76c in FIG. 13A) which are in parallel relationship with each other from the left-side image 76 obtained by the left camera C0, which is a reference camera. Then, the shift amount detection unit 12 searches the corresponding areas of the right-side image 78 which are the most highly correlated to the reference areas 76a, 76b, and 76c of the left-side image 76. Even there is a shift by the rotation, the shift is not very large, and therefore, the shift amount detection unit 12 may first set the search areas 78a, 78b, and 78c which are a bit larger than the reference areas and including the corresponding positions of the reference areas 76a, 76b, and 76c, for example. Then, the shift amount detection unit 12 searches the corresponding areas of the reference areas 76a, 76b, and 76c within the respective set search areas 78a, 78b, and 78c and determines the corresponding areas which are the most highly correlated to the reference areas 76a, 76b, and 76c.

FIG. 13B shows an example of corresponding areas 78d, 78e, and 78f as determined from the right-side image 78. The shift amount detection unit 12 calculates an angle between a line that passes the centers of the areas 78d, 78e, and 78f with respect to a horizontal line by a least-squares method. This angle should be zero when the shift by the rotation of the left camera C0 and the right camera C1 is not generated, therefore, the angle θ (=arctan slope) is the rotational shift amount to be corrected.

The image correction unit 11 corrects the image 78 by inputting "θ" for a parameter of affine transformation.

Figure 14A:
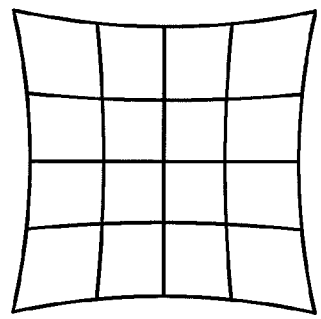
FIG. 14A and FIG. 14B are views showing examples of distortion.
Figure 14B:
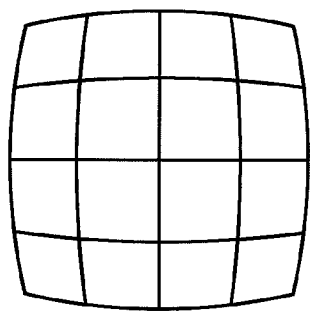

FIG. 14A and FIG. 14B are exemplary views showing examples of distortion. The distortion includes pincushion distortion as shown in FIG. 14A and barrel distortion as shown in FIG. 14B. In this embodiment, as the left camera C0 and the right camera C1 include the same type of lenses 21a and 21b, it is assumed that the same kind of the distortion occurs for the left camera C0 and the right camera C1.

Further, since such distortions do not vary with time, the correction parameter may be provided as a property of the lens (21a or 21b) by a manufacturer. The image correction unit 11 adjusts the images obtained by the left camera C0 and the right camera C1 based on the correction parameters. The correction parameters include coordinates to which the current coordinates are to be moved corresponding to the current coordinates, or a function by which a coordinate to which the current coordinate is to be moved is output when inputting the current coordinate.

As described above, the stereo camera apparatus 100 can appropriately correct the images including the shift "dx" in the horizontal direction and the shift "dy" in the vertical direction.

(Distance Measurement)

The distance measurement unit 14 calculates the distance of the object based on the following equation as explained above with reference to FIG. 1.

$$d = Bf/p$$

Here, "B" is the base line length of the left camera C0 and the right camera C1, "f" is the focal length, "p" is the parallax and "d" is the distance.

Figure 15:
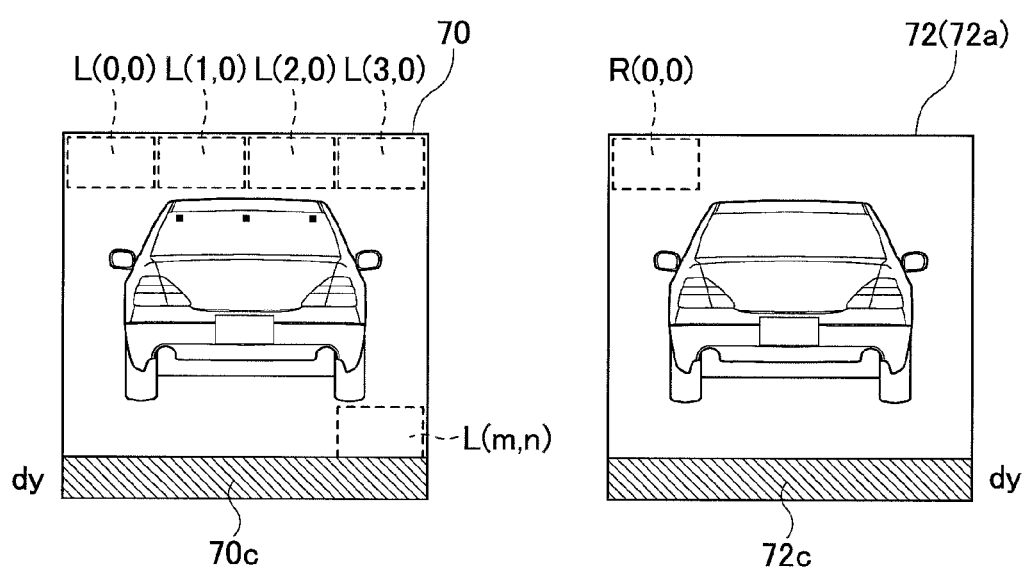
FIG. 15 is a view for explaining an example of a calculation of distance information.

FIG. 15 is an exemplary view for explaining an example of a calculation of distance information.

The distance measurement unit 14 selects the matching area based on the vertical shift amount "dy" detected by the shift amount detection unit 12. The distance measurement unit 14 removes the area from the matching area where the predetermined pixel value such as 255 (white), 0 (black) or the like, for example, are added as described above with reference to FIG. 12B. In this embodiment, the lower part 72*c* of the right-side image 72 (corrected image 72*a*) and a lower part 70*c* of "dy" of the left-side image 70 corresponding to the lower part 72*c* of the right-side image 72 are removed from the matching area.

Then, the distance measurement unit 14 separates the left-side image 70 into plural rectangular small areas. Subsequently, the distance measurement unit 14 obtains a correlation value between the small area L(0,0) of the left-side image 70 and the corresponding small area, having the same size as the small area L(0,0), of the right-side image 72. By shifting the position of the corresponding small area in the right-side image 72 in the horizontal direction, the distance measurement unit 14 selects the corresponding small area (which is referred to as "small area R(0,0)" hereinafter) in the right-side image 72 whose correlation value with the small area R(0,0) of the left-side image 70 becomes the largest. In this embodiment, as the shifts other than a parallax are already corrected, there is no remaining shift to be made in the vertical direction. Therefore, it is only necessary for the distance measurement unit 14 to search in the horizontal direction.

The shift amount between the small area L(0,0) of the left-side image 70 and the selected small area R(0,0) of the right-side image 72 is the parallax p(0,0) at the small area L(0,0). Similarly, the parallaxes p(1,0), p(2,0), p(3,0), . . . , and p(m,n) of the entirety of the small areas L(1,0), L(2,0), L(3,0), . . . , and L(m,n) are obtained. At this time, the unit of "p" is the pixel, therefore, the distance measurement unit 14 calculates the value "p" expressed by the distance based on the size of each of the pixels. The distance measurement unit 14 inputs the value "p" in the above equation to obtain the distance "d(m,n)" for each of the small areas L(m,n).

When the camera unit 200 is mounted on an automobile, the distance measurement unit 14 is intended to obtain distance information of a target in front such as another automobile, a pedestrian or an obstacle. Therefore, such a target may be extracted from the image by template matching or the like, and the small area L to which the detection of the parallax "p" is performed may be previously specified. By this method, the time necessary to determine the parallax p can be shortened.

The digital signal processing unit 28 outputs the distance information to an Electronic Control Unit (ECU) of the automobile. Then, the ECU can aid a driver not to crash or to control the space between their own automobile and the obstacle in front by alerting a driver or controlling a brake actuator to control the automobile.

As described above, the stereo camera apparatus 100 of the embodiment can read out the same portion of the object by the left camera C0 and the right camera C1 even when the shift is generated in the vertical direction; therefore, even when image sensors of rolling shutters are used, the distance information can be accurately calculated.

According to the embodiment, a stereo camera apparatus, adopting image sensors by which the exposure is sequentially performed for each of the pixels for distance measurement, capable of correcting the distortion of a moving object in addition to a shift of images caused by a shift of optical axes, is provided.

The present invention is not limited to the specifically disclosed embodiments, and variations and modifications may be made without departing from the scope of the present invention.

The present application is based on Japanese Priority Application No. 2011-061724 filed on Mar. 18, 2011, the entire contents of which are hereby incorporated herein by reference.

What is claimed is:

1. A stereo camera apparatus for obtaining distance information of an object, comprising:
   a camera unit that includes a left image sensor and a right image sensor which are positioned parallel to each other to respectively obtain a left-side image and a right-side image, each of the images being composed of a frame including plural pixels of plural rows and plural columns, the left image sensor and the right image sensor sequentially exposing the pixels of the rows from an upper row to a lower row in the frames, respectively;
   a shift amount detection unit that detects a relative positional shift amount in the vertical direction between a left-side image and a right-side image respectively obtained by the left image sensor and the right image sensor; and
   a timing control unit that changes a starting time of exposing the frame by the left image sensor or by the right image sensor based on the positional shift amount in the vertical direction detected by the shift amount detection unit.

2. The stereo camera apparatus according to claim 1,
   wherein the timing control unit delays the starting time of exposing the frame by the left image sensor or by the right image sensor for which the relative position of the obtained image with respect to the image obtained by the opposite image sensor is shifted upward, for a time corresponding to the vertical shift amount.

3. The stereo camera apparatus according to claim 1, further comprising:
   a correction unit that shifts the positions of the pixels of a left-side image obtained by the left image sensor or a right-side image obtained by the right image sensor based on the positional shift amount in the vertical direction detected by the shift amount detection unit.

4. The stereo camera apparatus according to claim 3,
   wherein the shift amount detection unit detects a relative positional shift amount in the horizontal direction between the left-side image and the right-side image respectively obtained by the left image sensor and the right image sensor, and
   the correction unit shifts the positions of the pixels of the left-side image obtained by the left image sensor or the right-side image obtained by the right image sensor for a distance equivalent to a difference between the relative positional shift amount in the horizontal direction detected by the shift amount detection unit and a predetermined appropriate positional shift amount.

5. The stereo camera apparatus according to claim 1,
   wherein the shift amount detection unit obtains a first reference image and a second reference image respectively obtained by the left image sensor and the right image sensor, each of the reference images including a marker object fixed to be within a field of vision of the left image sensor and the right image sensor, and
   detects the relative positional shift amount in the vertical direction based on the positions of the marker object in the first reference image and in the second reference image.

6. The stereo camera apparatus according to claim 1, wherein the left image sensor and the right image sensor are rolling shutters.

7. The stereo camera apparatus according to claim 1, wherein the timing control unit delays the starting time of exposing the frame by the left image sensor or by the right image sensor so that the left image sensor and the right image sensor expose an image of a same object at the same time.

8. A method of obtaining an image obtained by a stereo camera apparatus including a left image sensor and a right image sensor, each of the sensors sequentially exposing pixels of rows from an upper row to a lower row in a frame, comprising:

detecting a relative positional shift amount in a vertical direction between a left-side image and a right-side image respectively obtained by the left image sensor and the right image sensor; and changing a starting time of exposing the frame by the left image sensor or by the right image sensor based on the positional shift amount in the vertical direction detected in the detecting the relative positional shift amount in the vertical direction.

9. The method of obtaining an image according to claim 8, further comprising:

shifting the positions of the pixels of a left-side image obtained by the left image sensor or a right-side image obtained by the right image sensor based on the positional shift amount in the vertical direction detected in the detecting the relative positional shift amount in the vertical direction.

10. The method of obtaining an image according to claim 8, wherein in changing the starting time of exposing the frame, the starting time of exposing the frame by the left image sensor or by the right image sensor is delayed so that the left image sensor and the right image sensor expose respective images of a same object at the same time.

\* \* \* \* \*